United States Patent
Grecia

(10) Patent No.: US 8,402,555 B2
(45) Date of Patent: Mar. 19, 2013

(54) PERSONALIZED DIGITAL MEDIA ACCESS SYSTEM (PDMAS)

(76) Inventor: William Grecia, Grandville, MI (US)

(*) Notice: Subject to any disclaimer, the term of this patent is extended or adjusted under 35 U.S.C. 154(b) by 0 days.

(21) Appl. No.: 13/397,517

(22) Filed: Feb. 15, 2012

(65) Prior Publication Data

US 2012/0151220 A1     Jun. 14, 2012

Related U.S. Application Data

(63) Continuation of application No. 12/985,351, filed on Jan. 6, 2011, which is a continuation of application No. 12/728,218, filed on Mar. 21, 2010, now abandoned.

(51) Int. Cl.
*H04L 29/06* (2006.01)

(52) U.S. Cl. .............. 726/29; 726/28; 713/185

(58) Field of Classification Search ............... 726/1–21, 726/26–33; 713/155–159, 168, 172–176, 713/185, 182
See application file for complete search history.

(56) References Cited

U.S. PATENT DOCUMENTS

| | | | |
|---|---|---|---|
| 5,010,571 A | 4/1991 | Katznelson | |
| 5,247,575 A | 9/1993 | Sprague | |
| 5,267,313 A | 11/1993 | Hirata | |
| 5,319,705 A | 6/1994 | Halter | |
| 5,349,642 A | 9/1994 | Kingdon | |
| 5,509,074 A | 4/1996 | Choudhury | |
| 5,586,186 A | 12/1996 | Yuval | |
| 5,719,938 A | 2/1998 | Haas | |
| 5,737,416 A | 4/1998 | Cooper | |
| 5,870,543 A | 2/1999 | Ronning | |
| 5,883,954 A | 3/1999 | Ronning | |
| 5,883,955 A | 3/1999 | Ronning | |
| 5,887,060 A | 3/1999 | Ronning | |
| 5,903,647 A | 5/1999 | Ronning | |
| 5,907,617 A | 5/1999 | Ronning | |
| 6,385,596 B1 | 5/2002 | Wiser | |
| 6,611,812 B2 | 8/2003 | Hurtado | |
| 6,665,797 B1 | 12/2003 | Keung | |
| 6,799,165 B1 | 9/2004 | Boesjes | |
| 7,254,235 B2* | 8/2007 | Boudreault et al. | 380/239 |
| 7,266,839 B2 | 9/2007 | Bowers et al. | |
| 7,290,699 B2 | 11/2007 | Reddy | |
| 7,340,769 B2 | 3/2008 | Baugher | |
| 7,343,014 B2* | 3/2008 | Sovio et al. | 380/278 |
| 7,386,513 B2 | 6/2008 | Lao | |
| 7,515,710 B2 | 4/2009 | Grab | |
| 7,516,495 B2 | 4/2009 | Shoemaker | |
| 7,526,650 B1* | 4/2009 | Wimmer | 713/176 |

(Continued)

FOREIGN PATENT DOCUMENTS

| | | |
|---|---|---|
| EP | 1505530 A1 | 2/2005 |
| EP | 1564621 A1 | 8/2005 |

(Continued)

OTHER PUBLICATIONS

Liu et al. 2004 NPL—A license-sharing scheme in Digital Rights Management.*

(Continued)

*Primary Examiner* — Jung Kim
*Assistant Examiner* — Tri Tran

(57) ABSTRACT

The invention is an apparatus that facilitates access to encrypted digital media to accept verification and authentication from an excelsior enabler using at least one token and at least one electronic identification. The at least one electronic identification could be a device serial number, a networking MAC address, or a membership ID reference from a web service. Access to the product is also managed with a plurality of secondary enablers using the at least one electronic identification reference.

26 Claims, 7 Drawing Sheets

U.S. PATENT DOCUMENTS

| | | |
|---|---|---|
| 7,567,987 B2 | 7/2009 | Shappell et al. |
| 7,568,111 B2 | 7/2009 | Alve |
| 7,571,328 B2 | 8/2009 | Baumert |
| 7,594,275 B2 | 9/2009 | Zhu |
| 7,610,630 B2 | 10/2009 | Ji |
| 7,624,417 B2 | 11/2009 | Dua |
| 7,634,734 B2 | 12/2009 | Fuller et al. |
| 7,689,823 B2 | 3/2010 | Shen |
| 7,702,592 B2 | 4/2010 | Taylor |
| 8,250,145 B2 | 8/2012 | Zuckerberg |
| 8,280,959 B1 | 10/2012 | Zuckerberg |
| 2002/0010759 A1 | 1/2002 | Hitson |
| 2002/0157002 A1 | 10/2002 | Messerges |
| 2003/0018491 A1 | 1/2003 | Nakahara |
| 2003/0051149 A1 | 3/2003 | Robert |
| 2003/0220880 A1 | 11/2003 | Lao |
| 2004/0024670 A1 | 2/2004 | Valenzuela |
| 2004/0062400 A1 | 4/2004 | Sovio |
| 2004/0162786 A1 | 8/2004 | Cross |
| 2004/0220878 A1 | 11/2004 | Lao |
| 2005/0065891 A1* | 3/2005 | Lee et al. .................. 705/59 |
| 2005/0066353 A1 | 3/2005 | Fransdonk |
| 2005/0138406 A1 | 6/2005 | Cox |
| 2005/0182727 A1 | 8/2005 | Robert |
| 2005/0182931 A1 | 8/2005 | Robert |
| 2005/0198510 A1 | 9/2005 | Robert |
| 2005/0216752 A1 | 9/2005 | Robert |
| 2006/0036554 A1 | 2/2006 | Schrock |
| 2006/0173787 A1 | 8/2006 | Weber |
| 2006/0173789 A1 | 8/2006 | Baumert |
| 2006/0259852 A1 | 11/2006 | Upendran |
| 2006/0259982 A1 | 11/2006 | Upendran |
| 2007/0010334 A1 | 1/2007 | Multerer |
| 2007/0055887 A1 | 3/2007 | Cross |
| 2007/0156719 A1 | 7/2007 | Upendran |
| 2007/0179854 A1 | 8/2007 | Ziv |
| 2007/0180485 A1 | 8/2007 | Dua |
| 2007/0250445 A1 | 10/2007 | Ache |
| 2007/0266095 A1 | 11/2007 | Billsus et al. |
| 2008/0010685 A1* | 1/2008 | Holtzman et al. .............. 726/27 |
| 2008/0027869 A1 | 1/2008 | Kalker |
| 2008/0091606 A1 | 4/2008 | Grecia |
| 2008/0109911 A1 | 5/2008 | Tedesco |
| 2008/0114992 A1 | 5/2008 | Robert |
| 2008/0137869 A1 | 6/2008 | Robert |
| 2008/0165956 A1 | 7/2008 | Zhu |
| 2008/0209576 A1 | 8/2008 | Nooning |
| 2009/0012805 A1 | 1/2009 | Schnell |
| 2009/0049556 A1 | 2/2009 | Vrielink |
| 2009/0083541 A1* | 3/2009 | Levine .......................... 713/165 |
| 2009/0086975 A1 | 4/2009 | Robert |
| 2009/0089884 A1 | 4/2009 | Robert |
| 2009/0100060 A1 | 4/2009 | Livnat et al. |
| 2009/0106850 A1 | 4/2009 | Robert |
| 2009/0164776 A1 | 6/2009 | Tuoriniemi |
| 2009/0183010 A1 | 7/2009 | Schnell |
| 2009/0217036 A1 | 8/2009 | Irwin |
| 2009/0254930 A1 | 10/2009 | Lo |
| 2009/0257591 A1 | 10/2009 | Mithal |
| 2009/0265278 A1 | 10/2009 | Wang |
| 2009/0299963 A1 | 12/2009 | Pippuri |
| 2009/0307078 A1 | 12/2009 | Mithal |
| 2009/0327702 A1 | 12/2009 | Schnell |
| 2009/0328228 A1 | 12/2009 | Schnell |
| 2010/0027796 A1 | 2/2010 | Robert |
| 2010/0043077 A1 | 2/2010 | Robert |
| 2010/0057527 A1 | 3/2010 | Robert |
| 2010/0057871 A1 | 3/2010 | Kaplan |
| 2010/0100899 A1* | 4/2010 | Bradbury et al. ................ 725/29 |
| 2010/0299264 A1 | 11/2010 | Berger et al. |
| 2011/0145896 A1 | 6/2011 | Berger |
| 2011/0208695 A1 | 8/2011 | Anand |
| 2011/0265157 A1 | 10/2011 | Ryder |
| 2011/0288946 A1* | 11/2011 | Baiya et al. .................. 705/26.1 |
| 2011/0313898 A1 | 12/2011 | Singhal |
| 2011/0320345 A1 | 12/2011 | Taveau |
| 2012/0030291 A1 | 2/2012 | Silver |
| 2012/0036041 A1 | 2/2012 | Hesselink |
| 2012/0041829 A1 | 2/2012 | Rothschild |
| 2012/0066052 A1 | 3/2012 | Robert |
| 2012/0079095 A1 | 3/2012 | Evans |
| 2012/0079126 A1 | 3/2012 | Evans |
| 2012/0079276 A1 | 3/2012 | Evans |
| 2012/0079606 A1 | 3/2012 | Evans |
| 2012/0095871 A1 | 4/2012 | Dorsey |
| 2012/0095906 A1 | 4/2012 | Dorsey |
| 2012/0095916 A1 | 4/2012 | Dorsey |
| 2012/0124610 A1 | 5/2012 | Shintani |
| 2012/0124611 A1 | 5/2012 | Shintani |
| 2012/0124612 A1 | 5/2012 | Adimatyam |
| 2012/0124613 A1 | 5/2012 | Reddy |
| 2012/0124614 A1 | 5/2012 | Shintani |
| 2012/0124678 A1 | 5/2012 | Shintani |
| 2012/0130903 A1 | 5/2012 | Dorsey |
| 2012/0150727 A1 | 6/2012 | Nuzzi |
| 2012/0166333 A1 | 6/2012 | von Behren |
| 2012/0173333 A1 | 7/2012 | Berger |
| 2012/0173431 A1 | 7/2012 | Ritchie |
| 2012/0173625 A1 | 7/2012 | Berger |
| 2012/0191553 A1 | 7/2012 | Sathe |
| 2012/0254340 A1 | 10/2012 | Velummylum |
| 2012/0255033 A1 | 10/2012 | Dwivedi |
| 2012/0290376 A1 | 11/2012 | Dryer |
| 2012/0296741 A1 | 11/2012 | Dykes |
| 2012/0310828 A1 | 12/2012 | Hu |
| 2013/0007892 A1 | 1/2013 | Inooka |

FOREIGN PATENT DOCUMENTS

| | | |
|---|---|---|
| JP | 2007-183935 A | 7/2007 |
| KR | 10-2004-0107602 A | 12/2004 |
| KR | 10-2005-0028244 A | 3/2005 |
| KR | 1 0-2005-0060685 A | 6/2005 |
| KR | 10-0708203 B1 | 4/2007 |
| WO | 2008/111052 A2 | 9/2008 |

OTHER PUBLICATIONS

Simon L Garfinkel, "Email-Based Identification and Authentication: An Alternative to PKI?", IEEE Security & Privacy, http://computer.org/security/, published Nov. 2003, pp. 20-26.

Video Interview—Title: Mitch Singer, Sony Pictures—Publication Source: Youtube.com [URL: http://youtu.be/nqlSakADFII]—(Internet Publication Jun. 24, 2008) Note: Attached URL for Media NPL Reference.

Video Interview—Title: Jeff Bewkes and Brian Roberts discuss the TV Everywhere model and upcoming trial on Comcast—Publication Source: Youtube.com [URL: http://youtu.be/q8Rt9idJV9I]—(Internet Publication Jun. 25, 2009) Note: Attached URL for Media NPL Reference.

Author: William Grecia (patent applicant)—Publication Source: Amazon Web Services Products and Solutions Catalog—Title: STR3EM Digital Distribution System (Ultraviolet—Keychest)—Internet Publication: http://aws.amazon.com/customerapps/2621 [Publication date: Jun. 22, 2009].

Author: Nicholas Deleon—Publication Source: TechCrunch—Title: Movie studios launch Epix: 720p streaming video for free—Internet Publication: http://techcrunch.com/2009/06/08/movie-studios-launch-epix-720p-streaming-video-for-free/ [Publication date: Jun. 8, 2009].

Author: Matt Burns—Publication Source: TechCrunch—Title: TV Everywhere is Comcast and Time Warner's answer to free Internet video—Internet Publication: http://techcrunch.com/2009/06/24/tv-everywhere-is-comcast-and-time-warners-answer-to-free-internet-video/ [Publication date: Jun. 24, 2009].

Author—Michael Arrington—Movie Labels to Launch New "Open Market" Play Anywhere Scheme As Last Ditch Effort to Save DRM—Publication Source: TechCrunch.com [URL: http://techcrunch.com/2008/08/26/movie-labels-to-launch-new-open-market-play-anywhere-scheme-as-last-ditch-effort-to-save-drm/]—(Internet Publication Aug. 26, 2008).

Author—Mitch Singer—Developing the Digital Market—Publication Source: TechCrunch.com [URL: http://tctechcrunch.files.wordpress.com/2008/08/singer.pdf]—(Internet Publication Aug. 26, 2008).

Author: Brian Fox—Title: DECE UltraViolet Response to STR3EM Licensing Offer—Internet Publication: http://www.docstoc.com/docs/100643534/DECE-Note? [Publication date: Oct. 25, 2011]. Abandoned USPTO U.S. Appl. No. 61/303,292 (evidence to overcome examiner's last rejection in accordance with MPEP 2142).

Author—Preston Gralla—Digital River Launches DRM Solution for Software Publishers—Publication Source: informationweek.com [URL: http://www.informationweek.com/news/18901739]—(Internet Publication Date: Apr. 15, 2004).

Author—Digital River Corporation—Digital River Announces New Digital Rights Management Service—Publication Source: digitalriver.com [URL: http://www.digitalriver.com/corporate/press_releases/pr_328.shtml]—(Internet Publication Date: Jul. 14, 2003).

Author—Digital River Corporation—Digital River SoftwarePassport Copyright software—Publication Source: siliconrealms.com [URL: http://www.siliconrealms.com/]—(Internet Publication), Aug. 26, 2010.

Internet publication: Nook Color LendMe www.barnesand noble.com/, Jan. 21, 2011.

Internet publication: Coral consortium "Scenario" www.coral-interop.org, Feb. 27, 2006.

Author—wikipedia.org—Steam (software)—Publication Source: wikipedia.org (URL:http://en.wikipedia.org/wiki/Steam_(software), Aug. 13, 2004.

Author—William Grecia—STR3EM Windows Java C++ written code copyright and support documentation—Publication Source: str3em.com [URL: http://www.str3em.com]—(Software Copyright Publication Date and Invention Reduced to Practice: Sep. 3, 2009).

Author—William Grecia—Next Generation Digital Delivery STR3EM Ecosystem Replaces DVD and Blu-Ray—Publication Source:mi2n.com [URL: http://mi2n.com/press.php3?press_nb=130517]—(Internet Publication Date: May 28, 2010).

Author—Facebook Corporation—Graph API documentation—Publication Source: facebook.com [URL: http://developers.facebook.com/docs/api]—(Internet Publication Update: Apr. 21, 2010).

Author—Amazon Inc—Amazon Web Services API documentation—Publication Source: [URL: http://aws.amazon.com]—(Internet Publication), Jul. 16, 2002.

Author—Rick Merritt—Analysis: Hollywood's next digital media gambit—Publication Source: eetimes.com [URL: http://www.eetimes.com/design/audio-design/4005862/Analysis-Hollywood-s-next-digital-media-gambit]—(Internet Publication Date: Nov. 2, 2008).

Author—Ethan Smith—Disney Touts a Way to Ditch the DVD—Publication Source: Wall Street Journal Online [URL: http://online.wsj.com/article/NA_WSJ_PUB:SB10001424052748703816204575585650026945222.html]—(Internet Publication Date: Sep. 21, 2009).

Author—Neda Ulaby—Introducing UltraViolet: Buy Your Digital Movie Once, Play It Anywhere?—Publication Source: NPR Online [URL: http://www.npr.org/blogs/monkeysee/2010/07/19/128626624/introducing-ultraviolet-buy-your-movie-once-play-it-anywhere]—(Internet Publication Date: Jul. 20, 2010).

Author—William Grecia—The Retail Zip Company Releases Secure Electronic Media Format STR3EM to Replace DVD and Blu-ray—Publication Source: mi2n.com [URL: http://mi2n.com/press.php3?press_nb=1122843]—(Internet Publication Date: Sep. 3, 2009).

Author—Apple Corporation—iTunes application copyright—Publication Source: apple.com [URL: www.apple.com/itunes]—(Copyright Publication Date: Jan. 9, 2011).

Author—Microsoft Corporation—Zune application copyright—Publication Source: zune.net [URL: www.zune.net]—(Copyright Publication Date: Nov. 14, 2006).

Author—Netflix Corporation—Netflix application copyright—Publication Source: netflix.com [URL: www.netflix.com]—(Copyright Publication), Jan. 15, 2007.

Author—Best Buy Corporation—CinemaNow application copyright—Publication Source: cinemanow.com/ [URL: www.cinemanow.com/]—(Copyright Publication), May 18, 2010.

Author—Best Buy Corporation—Napster application copyright—Publication Source: napster.com/ [URL: www.napster.com/]—(Copyright Publication), May 1, 2006.

Author—Google Corporation—YouTube application copyright—Publication Source: youtube.com/ [URL:www.youtube.com/]—(Copyright Publication), Feb. 14, 2005.

Author—Wal-Mart Corporation—Vudu application copyright—Publication Source: vudu.com/ [URL: www.vudu.com/]—(Copyright Publication), Sep. 6, 2007.

Author—Connected Media Experience Org—CMX specification—Publication Source: connectedmediaexperience.org [URL: www.connectedmediaexperience.org/technicaloverview.html]—(Internet Publication), Jan. 27, 2009.

Author—SMPTE Org—Digital Cinema DCP MXF speifications—Publication Source: smpte.org [URL: www.smpte.org/standards]—(Internet Publication), Oct. 8, 2002.

Author—Wikipedia Org—Xbox Live Marketplace and Zune Marketplace—Publication Source: wikipedia.org [URL: http://en.wikipedia.org/wiki/Xbox_Live_Marketplace_and_Zune_Marketplace]—(Internet Publication), Jan. 18, 2006.

Author—Dan Franks—First Look. iTunes Digital Copy—Publication Source: macworld.com/ [URL: www.macworld.com/article/131751/2008/01/digitalcopy.html/]—(Internet Publication Jan. 22, 2008).

Author—Rich Fiscus—Review—Is DVD Digital Copy worth the trouble?—Publication Source: afterdawn.com/ [URL: www.afterdawn.com/news/article.cfm/2009/11/18/review_is_dvd_digital_copy_worth_the_trouble]—(Internet Publication Nov. 18, 2009).

Author—Wikipedia Org—Digital rights management—Publication Source: wikipedia.org [URL: http://en.wikipedia.org/wiki/Digital_Rights_Management]—(Internet Publication), Sep. 22, 2002.

Author—Wikipedia Org—Application programming interface—Publication Source: wikipedia.org [URL: http://en.wikipedia.org/wiki/Api]—(Internet Publication), Jul. 30, 2001.

Author—Wikipedia Org—Steam (content delivery)—Publication Source: wikipedia.org [URL: http://en.wikipedia.org/wiki/Steam_(content_delivery)]—(Internet Publication), Sep. 13, 2004.

Author—Ben Drawbaugh—Disney's KeyChest is not DRM—Publication Source: engadget.com [URL: www.engadget.com/2010/01/10/disneys-keychest-is-not-drm]—(Internet Publication Jan. 10, 2010).

Author—Richard Lawler—DECE & Keychest both laying claim to friendly DRM of the future title—Publication Source: engadget.com [URL: www.engadget.com/2010/01/06/dece-and-keychain-both-laying-claim-to-friendly-drm-of-the-future/]—(Internet Publication Jan. 6, 2010).

* cited by examiner

PERSONALIZED DIGITAL MEDIA ACCESS SYSTEM (PDMAS)

CROSS-REFERENCE TO RELATED APPLICATIONS

This application is a continuation of, and claims the priority benefit of, U.S. patent application co-pending Ser. No. 12/985,351 titled PERSONALIZED DIGITAL MEDIA ACCESS SYSTEM (PDMAS) filed Jan. 6, 2011; which is a continuation of, and claims the priority benefit of, U.S. patent application Ser. No. 12/728,218 filed Mar. 21, 2010 now abandoned, which are both incorporated herein by reference, in their entirety.

BACKGROUND OF THE INVENTION

1. Field of the Invention

The present invention relates to the field of digital rights management schemes used by creators of electronic products to protect commercial intellectual property copyrights privy to illegal copying using computerized devices. More specifically, the present invention teaches a more personal system of digital rights management which employs electronic ID, as part of a web service membership, to manage access rights across a plurality of devices.

2. Description of the Prior Art

Digital rights management (DRM) is a generic term for access control technologies used by hardware manufacturers, publishers, copyright holders and individuals to impose limitations on the usage of digital content across devices. DRM refers to any technology that inhibits undesirable or illegal uses of the digital content. The term generally doesn't refer to forms of copy protection that can be circumvented without modifying the file or device, such as serial numbers or key files. It can also refer to restrictions associated with specific instances of digital works or devices.

Traditional DRM schemes are defined as authentication components added to digital files that have been encrypted from public access. Encryption schemes are not DRM methods but DRM systems are implemented to use an additional layer of authentication in which permission is granted for access to the cipher key required to decrypt files for access. A computer server is established to host decryption keys and to accept authentication keys from Internet connected client computers running client software in which handles the encrypted files. The server can administer different authorization keys back to the client computer that can grant different sets of rules and a time frame granted before the client is required to connect with the server to reauthorize access permissions. In some cases content can terminate access after a set amount of time, or the process can break if the provider of the DRM server ever ceases to offer services.

In the present scenario, consumer entertainment industries are in the transition of delivering products on physical media such as CD and DVD to Internet delivered systems. The Compact Disc, introduced to the public in 1982, was initially designed as a proprietary system offering strict media to player compatibility. As the popularity of home computers and CD-ROM drives rose, so did the availability of CD ripping applications to make local copies of music to be enjoyed without the use of the disc. After a while, users found ways to share digital versions of music in the form of MP3 files that could be easily shared with family and friends over the Internet. The DVD format introduced in 1997 included a new apparatus for optical discs technology with embedded copy protection schemes also recognized as an early form of DRM.

With internet delivered music and video files, DRM schemes has been developed to lock acquired media to specific machines and most times limiting playback rights to a single machine or among a limited number of multiple machines regardless of the model number. This was achieved by writing the machine device ID to the metadata of the media file, then cross referencing with a trusted clearinghouse according to pre-set rules. DRM systems employed by DVD and CD technologies consisted of scrambling (also known as encryption) disc sectors in a pattern to which hardware developed to unscramble (also known as decryption) the disc sectors are required for playback. DRM systems built into operating systems such as Microsoft Windows Vista block viewing of media when an unsigned software application is running to prevent unauthorized copying of a media asset during playback. DRM used in computer games such as SecuROM and Steam are used to limit the amount of times a user can install a game on a machine. DRM schemes for e-books include embedding credit card information and other personal information inside the metadata area of a delivered file format and restricting the compatibility of the file with a limited number of reader devices and computer applications.

In a typical DRM system, a product is encrypted using Symmetric block ciphers such as DES and AES to provide high levels of security. Ciphers known as asymmetric or public key/private key systems are used to manage access to encrypted products. In asymmetric systems the key used to encrypt a product is not the same as that used to decrypt it. If a product has been encrypted using one key of a pair it cannot be decrypted even by someone else who has that key. Only the matching key of the pair can be used for decryption. After receiving an authorization token from a first-use action are usually triggers to decrypt block ciphers in most DRM systems. User rights and restrictions are established during this first-use action with the corresponding hosting device of a DRM protected product.

Examples of such prior DRM art include Hurtado (U.S. Pat. No. 6,611,812) who described a digital rights management system, where upon request to access digital content, encryption and decryption keys are exchanged and managed via an authenticity clearing house. Other examples include Alve (U.S. Pat. No. 7,568,111) who teaches a DRM and Tuoriniemi (U.S. Pat. No. 20090164776) who described a management scheme to control access to electronic content by recording use across a plurality of trustworthy devices that has been granted permission to work within the scheme.

Recently, DRM schemes have proven unpopular with consumers and rights organizations that oppose the complications with compatibility across machines manufactured by different companies. Reasons given to DRM opposition range from limited device playback restrictions to the loss of fair-use which defines the freedom to share media products will family members.

Prior art DRM methods rely on content providers to maintain computer servers to receive and send session authorization keys to client computers with an Internet connection. Usually rights are given from the server for an amount of time or amount of access actions before a requirement to reconnect with the server is required for reauthorization. At times, content providers will discontinue servers or even go out of business some years after DRM encrypted content was sold to consumers causing the ability to access files to terminate.

In the light of the foregoing discussion, the current states of DRM measures are not satisfactory because unavoidable issues can arise such as hardware failure or property theft that could lead to a paying customer loosing the right to recover purchased products. The current metadata writable DRM measures do not offer a way to provide unlimited interoperability between different machines. Therefore, a solution is needed to give consumers the unlimited interoperability between devices and "fair use" sharing partners for an infinite time frame while protecting commercial digital media from unlicensed distribution to sustain long-term return of investments.

SUMMARY OF THE INVENTION

An object of the present invention is to provide unlimited interoperability of digital media between unlimited machines with management of end-user access to the digital media.

In accordance with an embodiment of the present invention, the invention is a process of an apparatus which in accordance with an embodiment, another apparatus, tangible computer medium, or associated methods (herein referred to as The App) is used to: handle at least one branding action which could include post read and write requests of at least one writable metadata as part of at least one digital media asset to identify and manage requests from at least one excelsior enabler, and can further identify and manage requests from a plurality of connected second enablers; with at least one token and at least one electronic identification reference received from the at least one excelsior enabler utilizing at least one membership. Here, controlled by the at least one excelsior enabler, The App will proceed to receive the at least one token to verify the authenticity of the branding action and further requests; then establish at least one connection with at least one programmable communications console of the at least one membership to request and receive the at least one electronic identification reference; and could request and receive other data information from the at least one membership. The method then involves sending and receiving variable data information from The App to the at least one membership to verify a preexisting the at least one branding action of the at least one writable metadata as part of the at least one digital media asset; or to establish permission or denial to execute the at least one branding action or the post read and write requests of the at least one writable metadata. To do this, controlled by the at least one excelsior enabler. The App may establish at least one connection, which is usually through the Internet, with a programmable communications console, which is usually a combination of an API protocol and graphic user interface (GUI) as part of a web service. In addition, the at least one excelsior enabler provides reestablished credentials to the programmable communications console as part of the at least one membership, in which The App is facilitating and monitoring, to authenticate the data communications session used to send and receive data requests between the at least one membership and The App.

In accordance with another embodiment of the present invention, the present invention teaches a method for monitoring access to an encrypted digital media and facilitating unlimited interoperability between a plurality of data processing devices. The method comprises receiving a branding request from at least one communications console of the plurality of data processing devices, the branding request being a read and write request of metadata of the encrypted digital media, the request comprising a membership verification token corresponding to the encrypted digital media. Subsequently, the membership verification token is authenticated, the authentication being performed in connection with a token database. Thereafter, connection with the at least one communications console is established. Afterwards, at least one electronic identification reference is requested from the at least one communications console. Further, the at least one electronic identification reference is received from the at least one communications console. Finally, branding metadata of the encrypted digital media is performed by writing the membership verification token and the electronic identification reference into the metadata.

The present invention is particularly useful for giving users the freedom to use products outside of the device in which the product was acquired and extend unlimited interoperability with other compatible devices.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

Figure 1:
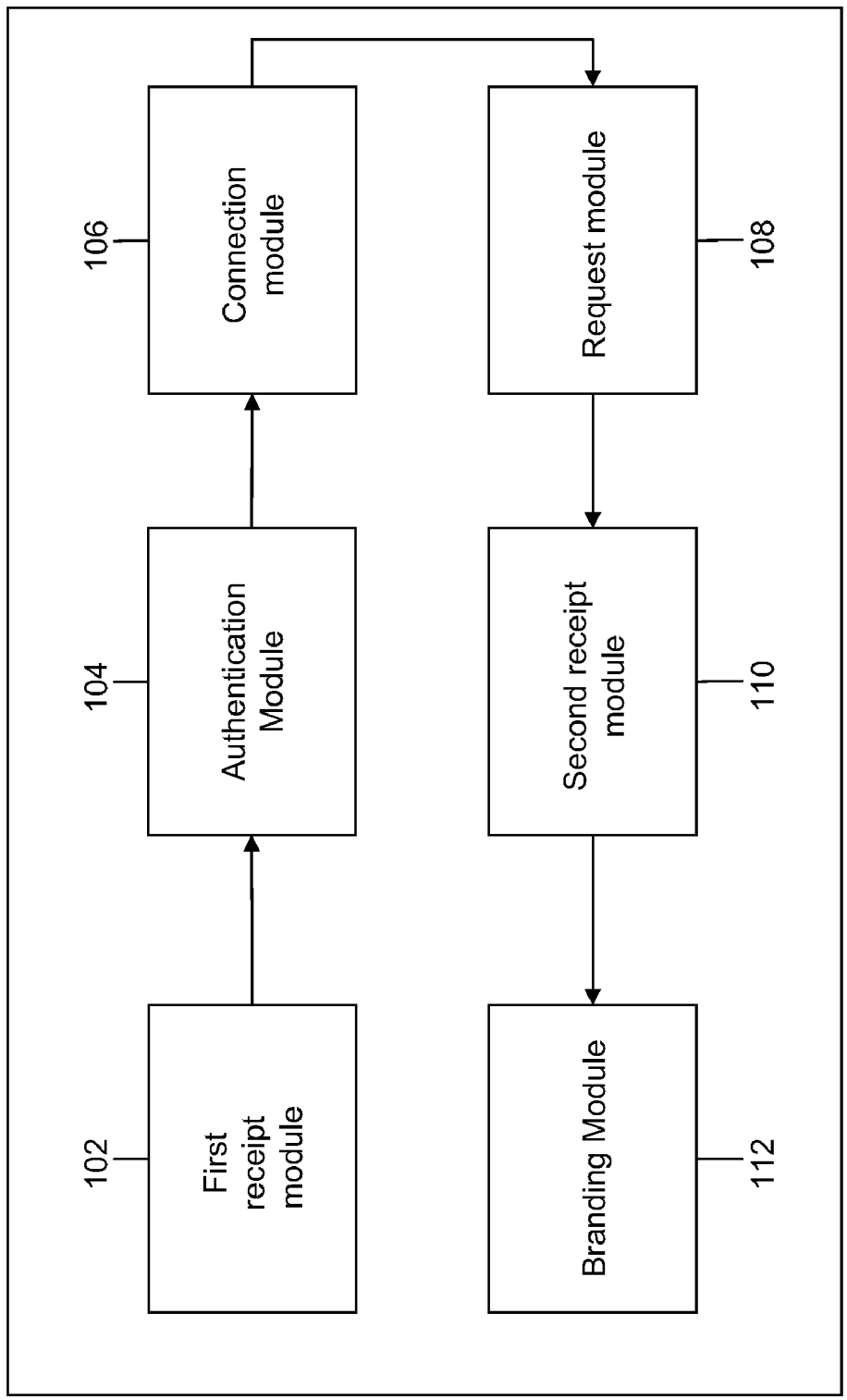
FIG. 1 shows a system for monitoring access to an encrypted digital media according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention

DETAILED DESCRIPTION OF THE DRAWINGS

Before describing in detail the particular system and method for personalised digital media access system in accordance with an embodiment of the present invention, it should be observed that the present invention resides primarily in combinations of system components related to the device of the present invention.

Accordingly, the system components have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as 'first' and 'second', and the like may be used solely to distinguish one entity or action from another entity or action without necessarily requiring or implying any actual such relationship or order between such entities or actions. The terms 'comprises', 'comprising', or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by 'comprises . . . a' does not, without more constraints, preclude the existence of additional identical elements in the process, method, article, or apparatus that comprises the element.

The present invention is directed at providing infinite access rights of legally acquired at least one encrypted digital media asset to the content acquirer, explained in this document as the excelsior enabler, and optionally to their recognized friends and family, explained in this document as a plurality of secondary enablers. To explain further, the excelsior enabler and secondary enablers defined comprises human beings or computerized mechanisms programmed to process steps of the invention as would normally be done manually by a human being. Additionally, an apparatus used alone or in accordance with an embodiment, another apparatus, tangible computer medium, or associated methods with a connection are needed (herein referred to as The App). To deliver the requirements of the invention, communicative and connected elements comprise: verification, authentication, electronic ID metadata branding, additional technical branding, and cross-referencing. The connection handling the communicative actions of the invention will usually be the Internet and can also be an internal apparatus cooperative. The App can further be defined as a Windows OS, Apple OS, Linux OS, and other operating systems hosting software running on a machine or device with a capable CPU, memory, and data storage. The App can be even further defined as a system on a chip (SOC), embedded silicon, flash memory, programmable circuits, cloud computing and runtimes, and other systems of automated processes.

The digital media assets used in this system are encrypted usually with an AES cipher and decryption keys are usually stored encoded, no encoded, encrypted, or no encrypted as part of the apparatus or as part of a connection usually an Internet server. As explained earlier, the system we will discuss will work as a front-end to encrypted files as an authorization agent for decrypted access.

FIG. 1 shows a system 100 for monitoring access to an encrypted digital media according to an embodiment of the present invention. The system 100 includes a first recipient module 102, an authentication module 104, a connection module 106, a request module 108, a second receipt module 110 and a branding module 112. The first receipt module 102 receives a branding request from at least one communications console of the plurality of data processing devices. The branding request is a read and write request of metadata of the encrypted digital media and includes a membership verification token corresponding to the encrypted digital media. Examples of the encrypted digital media includes, and are not limited to, one or more of a video file, audio file, container format, document, metadata as part of video game software and other computer based apparatus in which processed data is facilitated.

Subsequently, the authentication module 104 authenticates the membership verification token. The authentication is performed in connection with a token database. Further, the connection module 106 establishes communication with the at least one communication console.

According to an embodiment of the present invention, the connection is established through one of internet, intranet, Bluetooth, VPN, Infrared and LAN.

According to another embodiment of the present invention, the communication console is a combination of an Application Programmable interface (API) protocol and graphic user interface (GUI) as a part of web service. The API is a set of routines, data structures, object classes, and/or protocols provided by libraries and/or operating system services. The API is either one of language dependent or language independent.

The request module 108 requests at least one electronic identification reference from the at least one communication console. The second receipt module 110 receives the at least one electronic identification reference from the least one communication console. The branding module 112 brands metadata of the encrypted digital media by writing the membership verification token and the electronic identification into the metadata.

Figure 2:
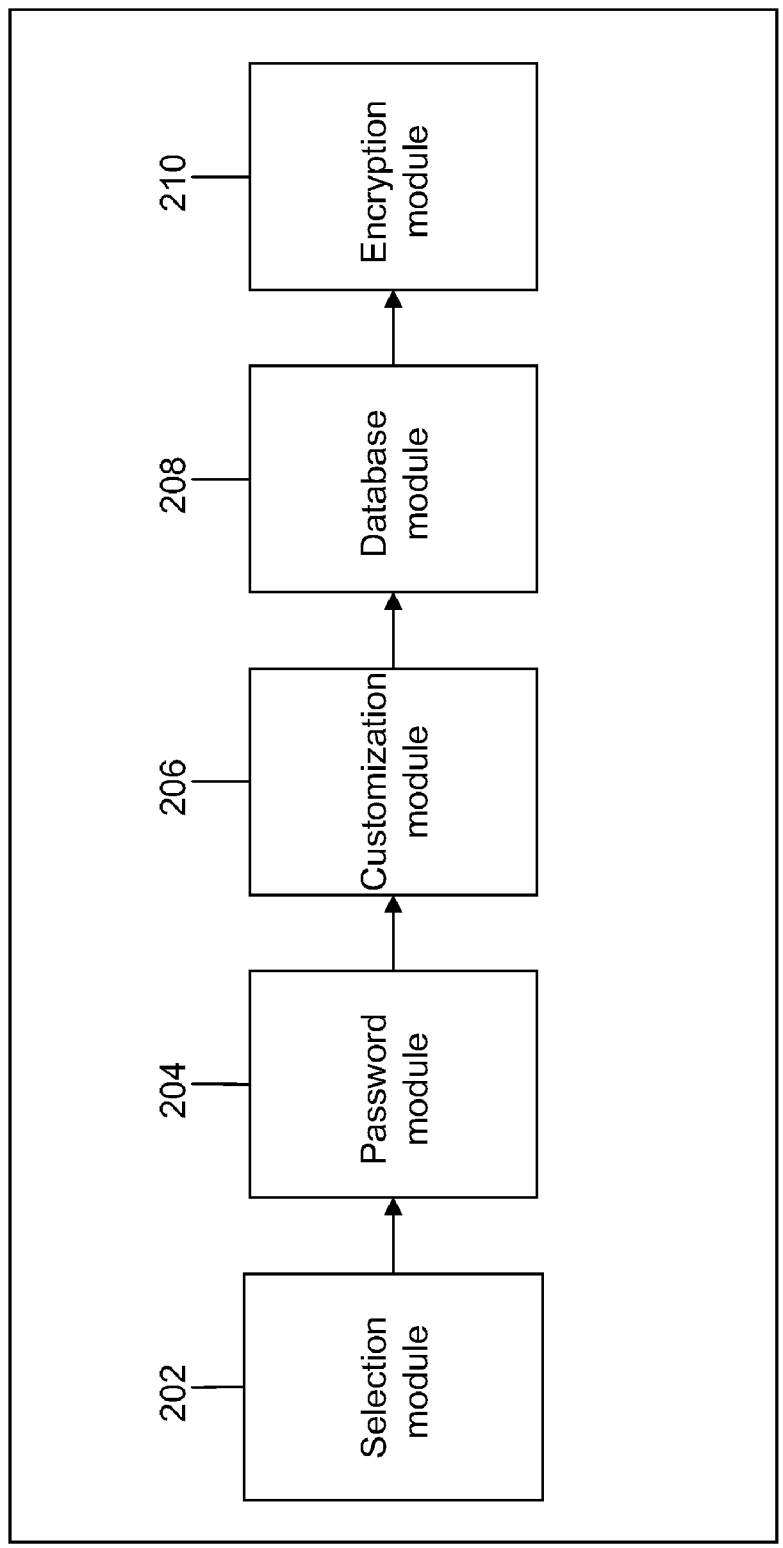
FIG. 2 shows a system for authoring an encrypted digital media according to an embodiment of the present invention.

FIG. 2 shows a system 200 for authoring an encrypted digital media according to an embodiment of the present invention. The figure includes a selection module 202, a password module 204, a customization module 206, a database module 208 and an encryption module 210. The selection module 202 facilitates selection of one or more media items to form the encrypted digital media. Examples of the one or media items include, and are not limited to, one or more of a video, an audio and a game.

According to an embodiment of the present invention, the one or more media items are one or more of remote URL links and local media files.

The password module 204 prompts the user to enter a master password which provides access to the encrypted digital media. Subsequently, the customization module 206 allows the user to customize the user access panel of the encrypted digital media.

According to an embodiment of the present invention, the customization module 206 facilitates adding one or more of a banner, a logo, an image, an advertisement, a tag line, a header message and textual information to the user access panel of the encrypted digital media.

Further, the database module 208 connects the encrypted digital media to a database of membership verification token required for decrypting the encrypted digital media.

According to an embodiment of the present invention, the membership verification token is a kodekey. The kodekey is a unique serial number assigned to the encrypted digital media.

The encryption module 210 encrypts the one or more media items to create the encrypted digital media.

According to an embodiment of the present invention, the system 200 further includes a watermark module. The watermark module watermarks information on the encrypted digital media, wherein the watermark is displayed during playback of the encrypted digital media.

According to another embodiment of the present invention, the system 200 further includes an access module. The access module allows the user to define access rights. Examples of the access rights include, but are not limited to, purchasing rights, rental rights and membership access rights.

According to yet another embodiment of the present invention, the system 200 further includes a name module. The name module allows the user to name the encrypted digital media.

Figure 3:
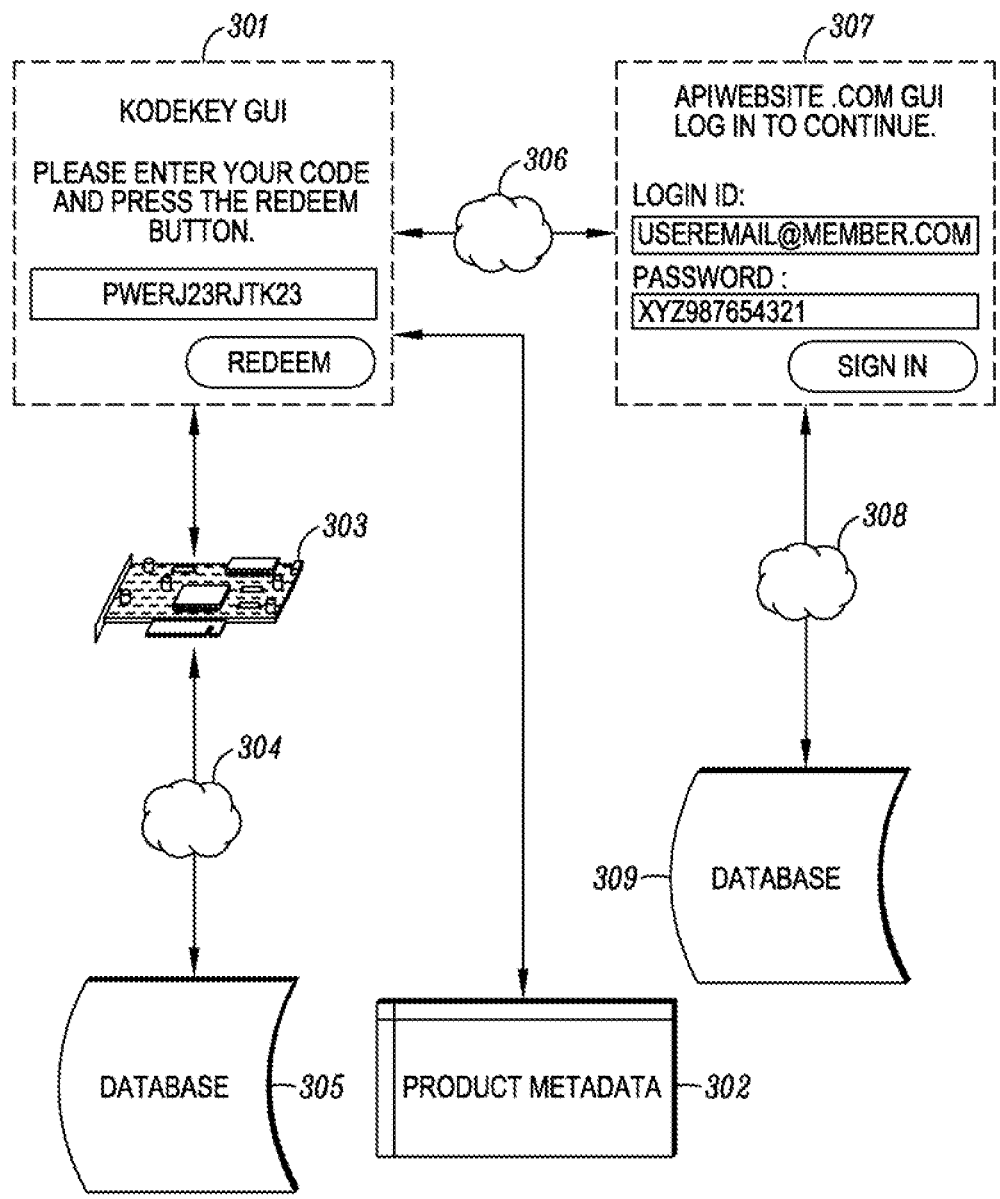
FIG. 3 shows a flow chart giving an overview of the process of digital media personalization according to an embodiment of the present invention.

FIG. 3 shows a flow chart giving an overview of the process of digital media personalization according to an embodiment of the present invention. The process is achieved by way of an enabler using an apparatus or otherwise known as an application in which facilitates digital media files. The apparatus interacts with all communicative parts required to fulfill the actions of the invention. The figure shows a Kodekey Graphical User Interface (GUI) 301, a product metadata 302, a networking card 303, internet 304, 306 and 308, database 305 and 309 and an APIwebsite.com GUI 307. A user posts a branding request via the Kodekey GUI interface 301. The Kodekey GUI interface 301 is the GUI for entering token. The Kodekey GUI interface 301 prompts the user to enter the token and press the redeem button present on the Kodekey GUI interface 301. The product metadata 302 is read/writable metadata associated with the digital media to be acquired. The networking card 303 facilitates querying of optional metadata branding process and referenced. The Kodekey GUI interface is connected to the database 305 via the internet 304 through the networking card 303. The database 305 is the database used to read/write and store the tokens, also referred to as token database. The user is redirected to the APIwebsite.com GUI 307 through the internet 306. The APIwebsite.com is the GUI to the membership API in which the electronic ID is collected and sent back to the Kodekey GUI interface 301. The APIwebsite.com GUI 307 prompts the user to enter a login id and a password to access the digital media which is acquired from the database 309 through the internet 308. The database 309 is the database connected to the web service membership in which the user's electronic ID is queried from.

Examples of the encrypted digital files include, and are not limited to, a video file, an audio file, container formats, documents, metadata as part of video game software and other computer based apparatus in which processed data is facilitated.

Figure 4:
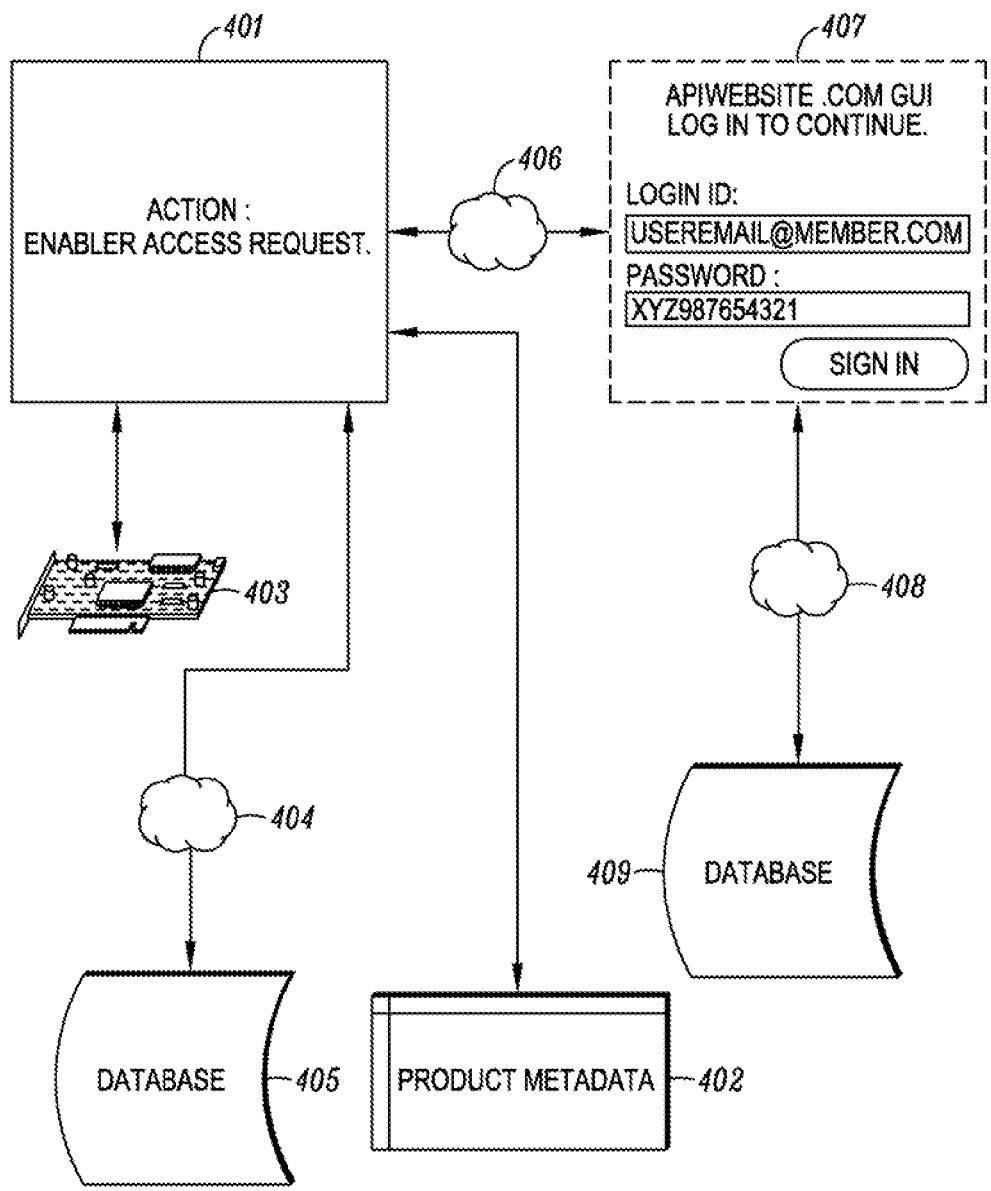
FIG. 4 shows a flow chart giving an overview of the process of an access request made by an enabler according to an embodiment of the present invention.

FIG. 4 shows a flow chart giving an overview of the process of an access request made by an enabler according to an embodiment of the present invention. Subsequently, the communicative parts to cross-reference information stored in the metadata of the digital media asset are checked which has been previously handled by the process of FIG. 1. The figure shows an enabler access request 401, a product metadata 402, a networking card 403, an internet 404, 406 and 408, a database 405 and 409 and an APIwebsite.com GUI 407, The enabler access request 401 facilitates the user to make a request for the digital media. The product metadata 402 is read/writable metadata associated with the digital media to be acquired. The networking card 403 facilitates querying of optional metadata branding process and referenced. The database 405 is the database used to read/write and store the tokens. The APIwebsite.com GUI 407 is the GUI in which the electronic ID is collected and sent back to the Kodekey GUI interface 301. The APIwebsite.com GUI 407 prompts the user to enter a login id and a password to access the digital media from the database 409 through the internet 408. The database 409 is the database connected to the web service membership in which the user's electronic ID is queried from.

Figure 5:
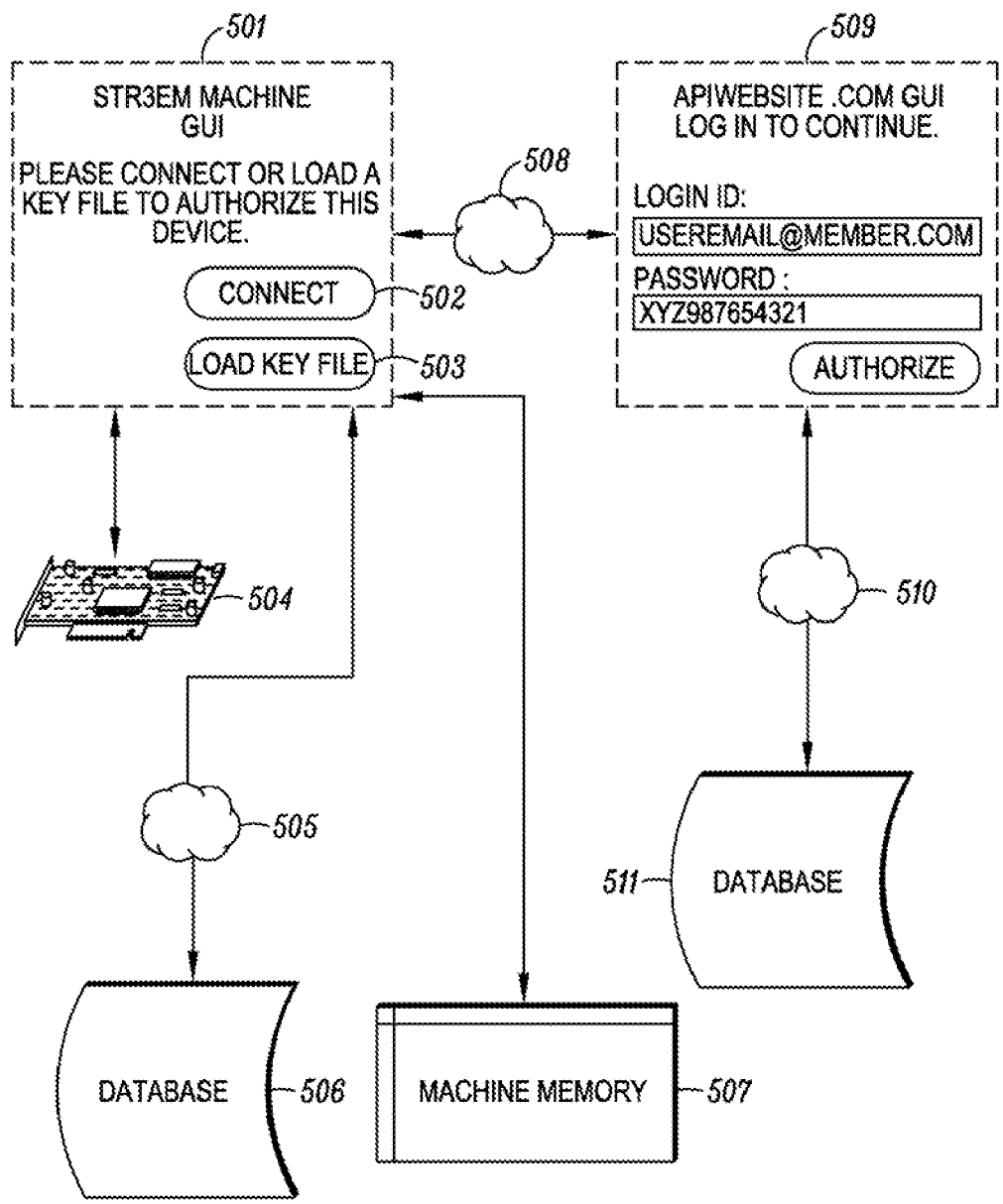
FIG. 5 shows personalized digital rights management component as part of a compatible machine with writable static memory.

FIG. 5 shows personalized digital rights management component as part of a compatible machine with writable static memory. The figure represents an authorization sequence action in which a machine is authorized to accept a personalized digital media file. The figure includes STR3EM Machine GUI 501 including the connect icon 502, a load key file icon 503, a networking card 504, an internet 505, 508 and 510, a database 506 and 511, a machine memory 507 and a APIwebsite.com GUI 509. The STR3EM Machine GUI 501 prompts the user to connect or load a key file to authorize the device through the connect icon 502 and the load key file icon 503. The STR3EM Machine GUI 501 is connected to the networking card 504. The networking card 504 facilitates querying of optional metadata branding process and referenced. Further, the STR3EM machine GUI 501 is connected to the database 506 via the internet 505. The database 506 is the database used to read/write and store the tokens. Moreover, STR3EM Machine GUI 501 is connected to the machine memory 507. The machine memory 507 represents the internal memory of the machine or device so authorizations can be saved for access of the digital media. The APIwebsite.com GUI 509 is connected to the STR3EM machine GUI through the internet 508. Further, APIwebsite.com GUI 509 is connected to the database 511 through the internet 510. The APIwebsite.com GUI 509 prompts the user to enter the login id and a password to authorize the access to digital media. The database 511 is the database connected to the web service membership in which the user's electronic ID is queried from.

Figure 6:
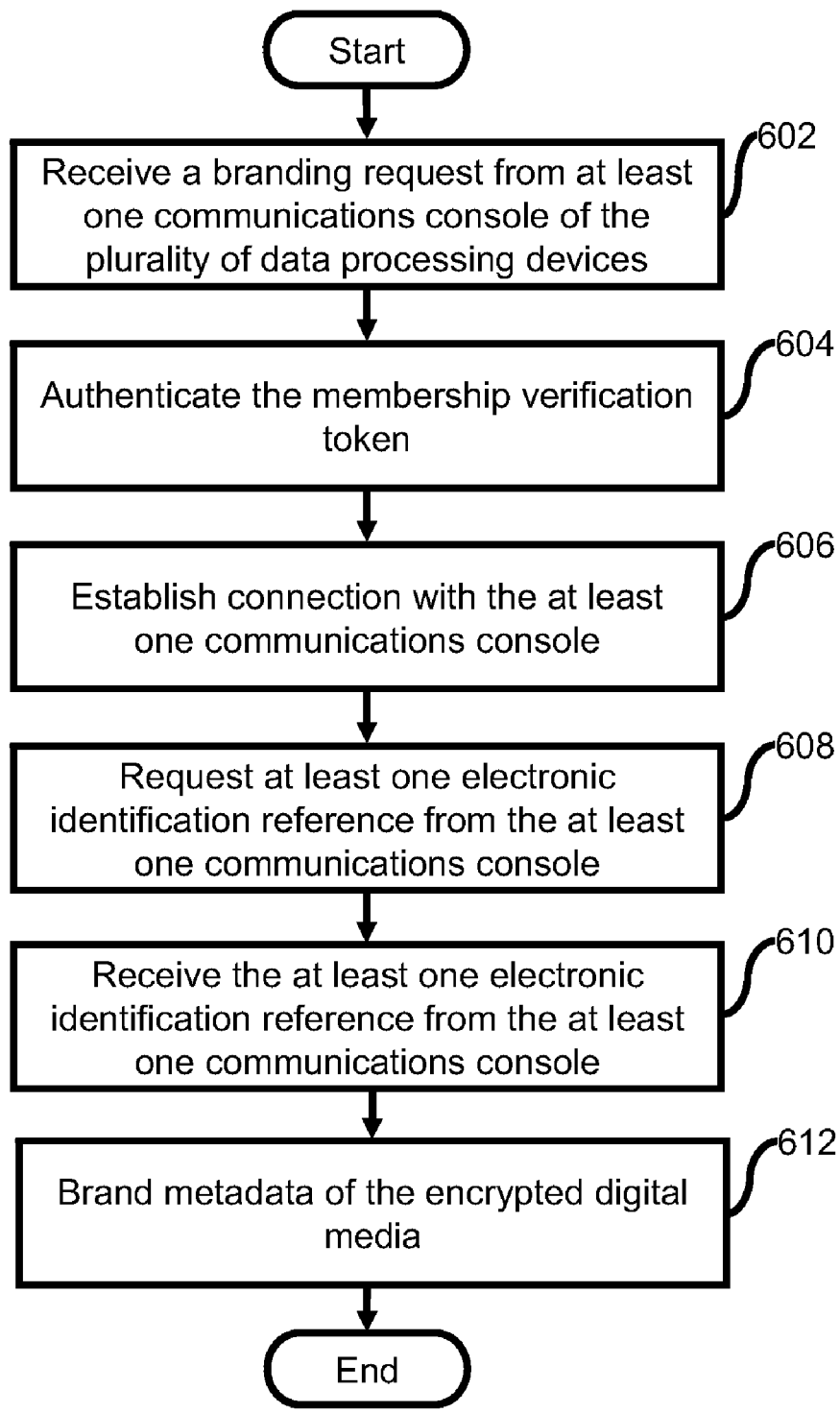
FIG. 6 shows a flowchart for monitoring access to an encrypted digital media according to an embodiment of the present invention

FIG. 6 shows a flowchart for monitoring access to an encrypted digital media according to an embodiment of the present invention. At step 602, a branding request is made by a user from at least at least one communications console of the plurality of data processing devices. The branding request is a read and write request of metadata of the encrypted digital media.

According to an embodiment of the present invention, the request includes a membership verification token corresponding to the encrypted digital media.

Subsequently, the membership verification token is authenticated at step 604. The authentication is performed in connection with a token database. Further, connection with the at least communication console is established at step 606. Afterwards, at least one electronic identification reference is requested from the at least one communications console at the step 608. At step 610, at least one electronic identification reference in received from the at least one communication console. Finally, metadata of the encrypted digital media is branded by writing the membership verification token and the electronic identification reference into the metadata at the step 612.

Figure 7:
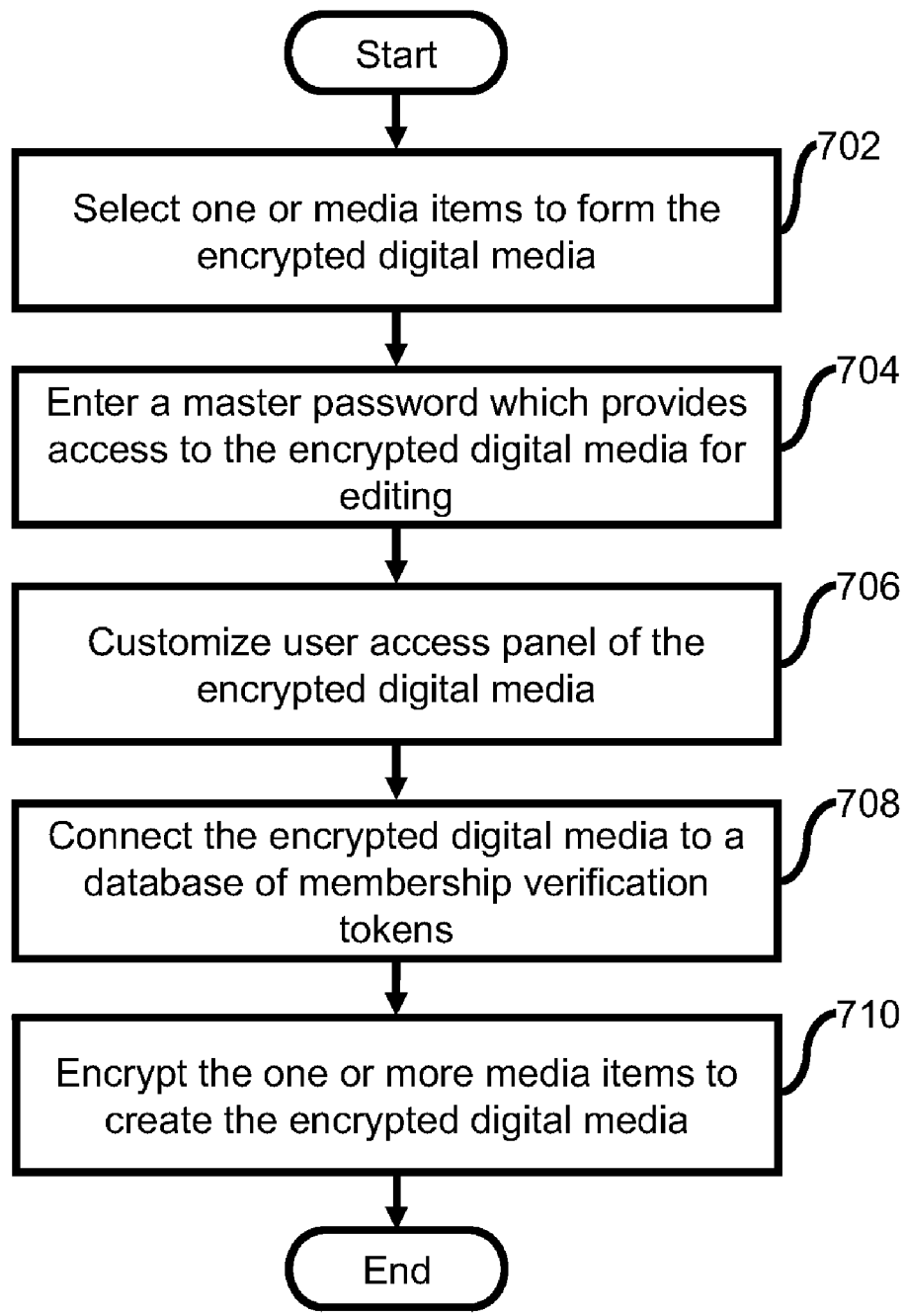
FIG. 7 shows a flowchart showing authoring an encrypted digital media according to an embodiment of the present invention.

FIG. 7 shows a flowchart showing authoring an encrypted digital media according to an embodiment of the present invention. At step 702, one or more media items are selected by the user to form the encrypted digital media. Subsequently, a master password is entered for providing access to the encrypted digital media for editing at step 704. Afterwards, the user customizes the user panel of the encrypted digital media at step 706. Further, the encrypted digital media is connected to a database of membership verification tokens required for decrypting the encrypted digital media at the step 708. Finally, the one or more media items are encrypted to create the encrypted digital media at the step 710.

According to various embodiments of the present invention, the verification is facilitated by at least one token handled by at least one excelsior enabler. Examples of the token include, and are not limited to, a structured or random password, e-mail address associated with an e-commerce payment system used to make an authorization payment, or other redeemable instruments of trade for access rights of digital media. Examples of e-commerice systems are PayPal, Amazon Payments, and other credit card services.

According to an embodiment of the present invention, an identifier for the digital media is stored in a database with another database of a list of associated tokens for cross-reference identification for verification.

According to an embodiment of the present invention, the database of a list of associated tokens includes Instant Payment Notification (IPN) received from successful financial e-commerce transactions that includes the identifier for the digital media; import of CSV password lists, and manually created reference phrases.

For this discussion, the structured or random password example will be used as reference. The structured or random passwords can be devised in encoded schemes to flag the apparatus of permission type such as: 1) Purchases can start a password sequence with "P" following a random number, so further example would be "PSJD42349MFJDF". 2) Rentals can start or end a password sequence with "R" plus (+) the number of days a rental is allowed, for example "R7" included in "R7SJDHFG58473" flagging a seven day rental. 3) Memberships can start or end a password sequence with "M" plus (+) optionally the length of months valid for example "M11DFJGH34KF" would flag an eleven-month membership period.

According to an embodiment of the present invention, the tokens are stored in a relational database such as MySQL or Oracle. Cloud storage systems such as Amazon's Web Services Simple Storage Solution, or also known as S3, provides a highly available worldwide replicated infrastructure. In addition to S3, monetization offerings such as DevPay offer developers the opportunity to make money from applications developed to use the services.

The verification will reference to the S3 and DevPay services for example purposes only as many options such as FTP, SimpleDB, solid state storage and others can be used to host the token hosting needed for the verification element of this invention. The token represents permission from the content provider to grant access rights to the excelsior enabler and thereafter the plurality of secondary enablers. To set up the verification the content provider can manually or automatically generate a single or a plurality of structured or random password in which will represent the token. By using public or private access of S3 as part of an apparatus, the content provider can create empty text files giving each the name of the passwords generated. Because S3 is associated with a highly available worldwide infrastructure, to check this password token can be done my simply constructing a HTTP request from the apparatus and triggering follow up actions based on either a 200 HTTP response, which means OK at which point the next action can happen, or a 400 HTTP response which means ERROR at which point the verification process is voided. An additional token can be used to provide a flag to the apparatus that the verification element has been fulfilled for an initial verification token. Creating an alternate version of the first token by appending a reference to the end, for example, does this: "M11DFJGH34KF_usergstr3em.com_01_01_11". In this example, it is defined that the eleven month authorized membership token was verified by a user@str3em.com on Jan. 1, 2011. By providing a second token, the first token becomes locked to ownership by the excelsior enabler preventing unauthorized users from reusing the first token without providing the authentication associated with the alternative referenced second token. In the interest of providers of the apparatus delivering this invention, this document will teach a method of a HTTP PUT calculation scheme for automatic royalty billing and administration for the token element used in the invention. Amazon's DevPay allow developers to attach monetary charges to data services of S3 offered as an embedded component of the apparatus. By using the "PUT" requests parameter, tokens generated by the apparatus are monitored, calculated, and charged to clients of the apparatus provider. For example: the default charge measure for DevPay is $0.05 for every 1000 PUT requests. By changing the amount to $100 for every 1000 PUT requests, the apparatus provider is paid a $0.10 royalty for each token created. Content providers using a connected apparatus like DevPay to deliver and manage digital media distribution do not need to have restrictions on the tokens created as with prior art DRM key providers as DevPay is charged on a pay-as-you-need model on a monthly basis. As a novelty to the apparatus provider, if a content provider fails to pay royalties due, the DevPay hosting will automatically deny token access to all related media products in distribution and restore this verification element when royalties are paid in full.

The authentication element of this invention is at least handled first by the at least one excelsior enabler with a connection to a membership. In the present discussion, the connection is equal to the Internet and the membership is equal to a web service. Further, the web service must be available for two way data exchange to complete the authentication process of this invention. Data exchange with a web service is usually facilitated with a programmable communications console, at most times, will be an Applications Programmable Interface (API). An API is a set of routines, data structures, object classes, and/or protocols provided by libraries and/or operating system services in order to support the building of applications. An API may be language-dependent: that is, available only in a particular programming language, using the particular syntax and elements of the programming language to make the API convenient to use in this particular context. Alternatively an API may be language-independent: that is, written in a way that means it can be called from several programming languages (typically an assembly/C-level interface). This is a desired feature for a service-style API that is not bound to a particular process or system and is available as a remote procedure call. A more detailed description of API that can be used for an apparatus can be found in the book, "Professional Web APIs with PHP: eBay, Google, Paypal, Amazon, FedEx plus Web Feeds", by Paul Reinheimer, Wrox publishers (2006). A program apparatus, scripts, often calls these APIs or sections of code residing on user computerized devices. For example, a web browser running on a user computer, cell phone, or other device can download a section of JavaScript or other code from a web server, and then use this code to in turn interact with the API of a remote Internet server system as desired. A Graphic User Interface (GUI) can be installed for human interaction or processes can be preprogrammed in a programmable script such as PHP, ASP.Net, Java, Ruby on Rails and others. The authentication element of the invention is usually embedded as a process of the apparatus but could be linked dynamically. In this document, the embedded version using a GUI will be used as reference. The web service equipped with the API is usually a well-known membership themed application in which the users must use an authentic identification. Some example includes Facebook in which as a rule, members are required to use their legal name identities. A reference number or name with the Facebook Platform API represents this information. Other verified web services in which real member names are required such as the LinkedIn API and the PayPal API and even others could be used, but for this discussion, Facebook will be used only as an example of how the authentication element of the invention is utilized. The Facebook API system, as well as others, operates based on an access authentication system called from a connected apparatus (which is usually an Internet powered desktop or browser based application) with an API Key, an Application Secret Key and could also include an Application ID. For example, the Facebook API Application Keys required to establish a data exchange session with the connected apparatus might look like:

```
API Key
37a925fc5ee9b4752af981b9a30e9a73gh
Application Secret
f2a2d92ef395cce88eb0261d4b4gsa782
Application ID
51920566446
```

The collective API keys are usually embedded in the source code of the apparatus, or stored on a remote Internet server, and could be included in the encrypted digital media metadata and inserted on-the-fly into calls made to the API from the connected apparatus. This allows dynamic API connection of the apparatus using keys issued to individual content providers so in the event of a reprimand of a single the individual content provider by the API provider, the collective the individual content providers and the enablers of the connected apparatus are not affected.

Upon an access request of the digital media, the excelsior enabler interacts with the apparatus, usually software or web application, to enter membership credentials in a GUI front-end connected to the API. The membership credentials are usually comprised of a login element comprising a name, phrase, or e-mail address, and a secret password. The credentials can be generated by the enabler or automatically generated by the web service. Once the enabler authenticates their identity with the membership, the apparatus facilitating the data communication can request relevant information to fulfill the process chain of the invention. For example, Facebook API Platform defines members as ID numbers, so if a member's real name is John Doe, then Facebook API ID (also programmatically known as the FBID) would be 39485678. Once the enabler successfully sign in to the GUI element then the apparatus will query the API for at least one electronic identification reference, in this discussion is the FBID. The FBID is received to the permanent or temporary memory of the apparatus to sustain the branding and cross-referencing requirements of the invention. Additional information can be requested according to membership status or connected "friends" of the enabler. Additional information can be made required for successful authentication and includes: a minimum amount of total friends, a minimum amount of female friends, a minimum amount of male friends, a minimum amount of available pictures, a minimum age limit and other custom rules can be defined by the apparatus. An example of how this would work is a content provider can define a minimum of 32 Facebook friends are required to access an encrypted digital media asset offered for sale or promotion. This is achieved by the apparatus handling a access request in which the enabler has not yet acquired access rights by executing and parsing information returned by the Facebook "Friends.get" API command.

XML return example of the Facebook "Friends.get" API command where a plurality of FBID are returned to the apparatus for parsing additional information as may be required to satisfy successful authentication:

```
<?xml version="1.0" encoding="UTF-8"?>
<friends_get_response xmlns="http://api.facebook.com/1.0/"
xmlns:xsi="http://www.w3.org/2001/XMLSchema-instance"
xsi:schemaLocation="http://api.facebook.com/1.0/
http://api.facebook.com/1.0/facebook.xsd"list="true">
<uid>222333</uid>
<uid>1240079</uid>
</friends_get_response>
```

When authenticating a compatible device or machine which may not have access to a connection for the authentication element, a key file or part of the metadata thereof could be made on another connected compatible device or machine and allow the enabler to execute Friends.get API command to collect and store the complete list of a plurality of FBID to the key file or the metadata thereof. The compatible device or machine which may not have access to a connection for the authentication element with an embedded interaction console, usually a user GUI, can request and load the key file or part of the metadata thereof to save the complete list of a plurality of electronic identification references, in this discussion is reference as the FBID, to storage or metadata as part of the compatible device or machine. This step ensures the cross-referencing element requirement of the invention can take place in the event the connection for the authentication element is not present in the compatible device or machine.

Another example is a content provider can allow shared access to friends of the excelsior enabler after a time period, like for example, 90 days. After the 90 day period, when media access is requested using the authentication element by a plurality of secondary enablers, which are usually friends and family of the excelsior enabler, the FBID of the excelsior enabler is cross-referenced with the FBID of the requesting secondary enabler by way of the apparatus ability to execute the Facbeook "Friends.areFriends" API command.

XML return example of the Facebeook "Friends.are-Friends" API command where FBID 2223322 and 2222333 are friends and FBID 1240077 and 1240079 are not friends:

```
<?xml version="1.0" encoding="UTF-8"?>
<friends_areFriends_response
xmlns=http://api.facebook.com/1.0/
xmlns:xsi=http://www.w3.org/2001/XMLSchema-instance
xsi:schemaLocation="http://api.facebook.com/1.0/
http://api.facebook.com/1.0/facebook.xsd"list="true">
<friend_info>
<uid1>222332</uid1><uid2>222333</uid2>
<are_friends>1</are_friends>
</friend_info>
<friend_info>
<uid1>1240077</uid1><uid2>1240079</uid2>
<are_friends>0</are_friends>
</friend_info>
</friends_areFriends_response>
```

Such usability can be important to sustain "fair use" rights of consumers of the digital media to emulate usability found with physical media products such as CD and DVD that can be loaned to friends and family after an inception grace period.

Once the information of the verification and authentication elements is acquired, the apparatus handles the next process of writing the information to the digital media metadata and can include additional information gathered from components of The App. Components of The App can include MAC address from a networking card, CRC checksum of an embedded file or circuit, SOC identifier, embedded serial number, OS version, web browser version, and many other identifiable components as part of The App. For this discussion, the MAC address from a networking card as part of The App will be used as reference of a secondary electronic identification reference. In computer networking, a Media Access Control address (MAC address) is a unique identifier assigned to most network adapters or network interface cards (NICs) by the manufacturer for identification, and used in the Media Access Control protocol sub-layer. If assigned by the manufacturer, a MAC address usually encodes the manufacturer's registered identification number. It may also be known as an Ethernet Hardware Address (EHA), hardware address, adapter address, or physical address. The novelty of embedding the MAC address along with the FBID of the excelsior enabler is to provide a plurality of electronic identification references in which cross-referencing actions can allow more rapid access to be granted with less interaction from an enabler. For example, to retrieve the FBID from Facebook to cross-reference with the FBID stored in the digital media metadata requires the enabler to possibly physically need to enter their login and password credentials to the GUI connected to the apparatus. It may be possible that web browser cookies allow automatic Facebook login by storing an active session key, but the session key is not guaranteed to be active at the time of an access request. While the enabler may not have an issue executing another authentication command, several remote operations could exist to control authentication and access requests separately from each other. The apparatus can execute a programmable retrieval command, usually a GET command, to locate and retrieve the MAC address from an attached or connected networking card. After the FBID is acquired, the MAC address is also acquired to write the plurality of electronic identifications to the metadata of the at least one encrypted digital media asset by; obtaining the decryption key to decrypt the encrypted digital media asset which is usually stored encoded, no encoded, encrypted, or no encrypted as part of the apparatus or as part of a connected source, usually an Internet server with an encrypted HTTPS protocol. A plurality of MAC addresses can be stored along with the FBID of the excelsior enabler to manage access rights across a plurality of devices. To understand metadata and the uses, metadata is defined simply as to "describe other data". It provides information about certain item's content. For example, an image may include metadata that describes how large the picture is, the color depth, the image resolution, when the image was created, and other data. A text document's metadata may contain information about how long the document is, who the author is, when the document was written, and a short summary of the document. Web pages often include metadata in the form of Meta tags. Description and keywords Meta tags are commonly used to describe the Web page's content. Most search engines use this data when adding pages to their search index. In the invention, the FBID and MAC addresses are written to the digital media asset metadata to prepare for the instant or delayed cross-referencing element of the invention. The same process of writing the information to the digital media metadata is true with secondary enablers allowing the same benefits of cross-referencing.

Cross-referencing, the last element of the invention is used to verify access rights of an enabler of a pre or post personalized encrypted digital media asset. Once an enabler executes an action for access request, the apparatus will obtain the decryption key to first seek the MAC address record. If the MAC address is found, then a cross-reference process is executed by comparing the MAC address retrieved from the metadata of the digital media file with the MAC address retrieved from the networking card connected to the apparatus or The App. If the comparison action proves to be true, then access rights are granted to the enabler. If the comparison fails, then the apparatus can either ask the enabler to participate in communication with the authentication element of the invention, or could deny further interactivity with the enabler. In this discussion, the apparatus requires the enabler to participate in communication with the authentication element to provide credentials to establish a cross-reference comparison with the FBID retrieved from the metadata and the FBID retrieved from the Facebook API. If the comparison action proves to be true, then access rights is granted to the excelsior enabler and the current MAC address of the networking card as part of The App is appended to the metadata of the encrypted digital media asset and access rights is granted to the excelsior enabler. If the FBID cross-reference fails, then the apparatus can either ask the potential secondary enabler to participate in communication with the authentication element of the invention, or could deny further interactivity with the potential secondary enabler. In this discussion, the apparatus requires the potential secondary enabler to participate in communication with the authentication element to provide credentials to establish a cross-reference comparison with the FBID retrieved from the metadata and the FBID retrieved from the Facebook "Friends.areFriends" API command to determine if the potential secondary enabler identity is true or false. The determination is in accordance to any possible access grace periods set by the content provider of the encrypted digital media asset. If the comparison action proves to be true, then access rights is granted to the secondary enabler and the current MAC address of the networking card as part of The App and the FBID retrieved are appended to the established metadata information of the encrypted digital media asset and access rights can be granted to a plurality of secondary enablers; unlimited interoperability between devices and "fair use" sharing partners for an infinite time frame while protecting commercial digital media from unlicensed distribution to sustain long-term return of investments is achieved.

While the present invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

What is claimed is:

1. A method for monitoring access to an encrypted digital media, the method facilitating interoperability between a plurality of data processing devices, the method comprising:
  receiving an encrypted digital media access branding request from at least one communications console of the plurality of data processing devices, the branding request being a read or write request of metadata of the encrypted digital media, the request comprising a membership verification token provided by a first user, corresponding to the encrypted digital media;
  authenticating the membership verification token, the authentication being performed in connection with a token database;
  establishing connection with the at least one communications console wherein the communications console is a combination of a graphic user interface (GUI) and an Applications Programmable Interface (API) protocol, wherein the API is obtained from a verified web service, the verified web service capable of facilitating a two way data exchange to complete a verification process;
  requesting at least one electronic identification reference from the at least one communications console wherein the electronic identification reference comprises a verified web service account identifier of the first user;
  receiving the at least one electronic identification reference from the at least one communications console; and
  branding metadata of the encrypted digital media by writing the membership verification token and the electronic identification reference into the metadata.

2. The method according to claim 1, wherein the membership verification token is one or more of a structured password, a random password, e-mail address, payment system and one or more redeemable instruments of trade for access rights of the encrypted digital media.

3. The method according to claim 1, wherein the branding request being a request from the first user through a data processing device of the plurality of data processing devices, the first user acquiring access rights to the encrypted digital media; or wherein the branding request being a request from one or more secondary users connected to the first user, the one or more secondary users comprising one or more of human beings or programmed computerized mechanisms in network of the first user; wherein the one or more secondary users are validated by a membership web service.

4. The method according to claim 3, wherein the membership verification token represents verification from content provider to grant access rights to the first user and the one or more secondary users.

5. The method according to claim 1, wherein the encrypted digital media is shared with one or more users according to a membership.

6. The method according to claim 5, wherein the one or more users are a network of recognized human beings using machines or recognized automated computerized mechanisms programmed by human beings, the recognition of the users being validated by the membership status of a membership web service.

7. The method according to claim 1, wherein the encrypted digital media is associated with an identifier stored in a database, the identifier being cross-referenced with a corresponding token from a list of associated tokens stored in the token database for verification.

8. The method according to claim 1, wherein the encrypted digital media is one of a video file, audio file, container format, document, metadata as part of video game software and other computer based apparatus in which processed data is facilitated.

9. The method according to claim 1, wherein the electronic identification reference is a key file, the key file being uploaded by the at least one communications console for branding the encrypted digital media; thereby giving access to the encrypted digital media.

10. The method of claim 1, wherein the method facilitates access rights authentication for the encrypted digital media, the branding request is an access request, and wherein the read or write request of metadata is performed in connection with a combination of a memory, CPU, server, database, and cloud system;

the access request is generated by either a human user, a machine, or a human programmed computerized device;
the access request further comprises a membership verification token and a rights token wherein the rights token is a flag indicating the verification token is successfully verified.

11. The method of claim 2, wherein the membership verification token comprises at least one token selected from a group consisting of a purchase permission, a rental permission, or membership permission coupled to a royalty scheme;

wherein the permission is represented by one or more of a letter, number, combination of letters and numbers, phrase, authorization, list, interface button or an instrument of trade for access rights of the encrypted digital media.

12. A system for monitoring access to an encrypted digital media, the system facilitating interoperability between a plurality of data processing devices, the system working as a front-end agent for access rights authorization between a plurality of data processing devices, the system comprising:

a first receipt module, the first receipt module receiving an encrypted digital media access branding request from at least one communications console of the plurality of data processing devices, the branding request being a read or write request of metadata of the encrypted digital media, the request comprising a membership verification token provided by a first user, corresponding to the encrypted digital media;

an authentication module, the authentication module authenticating the membership verification token, the authentication being performed in connection with a token database;

a connection module, the connection module establishing connection with the at least one communications console wherein the communications console is a combination of a graphic user interface (GUI) and an Applications Programmable Interface (API) protocol wherein the API is obtained from a verified web service, the verified web service capable of facilitating a two way data exchange to complete a verification process;

a request module, the request module requesting at least one electronic identification reference from the at least one communications console wherein the electronic identification reference comprises a verified web service account identifier of the first user, a second receipt module, the second receipt module receiving the at least one electronic identification reference from the at least one communications console; and a branding module, the branding module branding metadata of the encrypted digital media by writing the membership verification token and the electronic identification reference into the metadata.

13. The system according to claim 12, wherein the encrypted digital media is one of a video file, audio file, container format, document, metadata as part of video game software and other computer based apparatus in which processed data is facilitated.

14. The system according to claim 12, wherein the electronic identification reference is a key certificate file, the key certificate file being uploaded by the at least on communications console for branding the encrypted digital media; thereby giving access to the encrypted digital media.

15. A computer program product for use with a computer, the computer program product comprising a non-transitory computer usable medium having a computer readable program code stored therein for monitoring access to an encrypted digital media, the method facilitating interoperability between a plurality of data processing devices, the computer program product performing the steps of:

receiving an encrypted digital media access branding request from at least one communications console of the plurality of data processing devices, the branding request being a read or write request of metadata of the encrypted digital media, the request comprising a membership verification token provided by a first user, corresponding to the encrypted digital media;

authenticating the membership verification token, the authentication being performed in connection with a token database;

establishing connection with the at least one communications console wherein the communications console is a combination of a graphic user interface (GUI) and an Applications Programmable Interface (API) protocol wherein the API is obtained from a verified web service, the verified web service capable of facilitating a two way data exchange to complete a verification process;

requesting at least one electronic identification reference from the at least one communications console wherein the electronic identification reference comprises a verified web service account identifier of the first user;

receiving the at least one electronic identification reference from the at least one communications console; and branding metadata of the encrypted digital media by writing the membership verification token and the electronic identification reference into the metadata.

16. The computer program product of claim 15, wherein the membership verification token comprises at least one token selected from a group consisting of a purchase permission, a rental permission, or membership permission coupled to a royalty scheme;
wherein the permission is represented by one or more of a letter, number, combination of letters and numbers, phrase, authorization, list, interface button or an instrument of trade for access rights of the encrypted digital media.

17. The computer program product of claim 15, wherein the computer program product facilitates access rights authentication for the encrypted digital media, the branding request is an access request, and wherein the read or write request of metadata is performed in connection with a combination of a memory, CPU, server, database, and cloud system;
the access request is generated by either a human user, a machine, or a human programmed computerized device;
the access request further comprises a membership verification token and a rights token; wherein the rights token is a flag indicating the verification token is successfully verified.

18. The computer program product according to claim 15, wherein the branding request is a request from the first user providing a credential to a membership web service through a data processing device of the plurality of data processing devices, the first user being a human user acquiring access rights to the encrypted digital media.

19. The computer program product according to claim 18, wherein the branding request is a request from one or more secondary users asked to participate in providing a credential to the membership web service connected to the first user, the credential being one generated manually or generated automatically by the membership web service, the plurality of secondary user -comprising one or more of human beings or a programmed computerized mechanism in the network of the first user.

20. The computer program product according to claim 19, wherein the membership verification token represents verification from content provider to grant access rights to the first user and the one or more secondary users.

21. The computer program product according to claim 18, wherein the encrypted digital media is shared with one or more secondary users according to a membership status.

22. The computer program product according to claim 21, wherein the one or more secondary users is a programmed and automated machine hosting an operating system that is operated by the first user.

23. The computer program product according to claim 15, wherein the encrypted digital media is associated with an identifier stored in a database, the identifier being cross-referenced with a corresponding token from the list of associated tokens stored in the token database for verification.

24. The system of claim 12, wherein the system facilitates access rights authentication for the encrypted digital media, the branding request is an access request, and wherein the read or write request of metadata is performed in connection with a combination of a memory, CPU, server, database, and cloud system;
the access request is generated by either a human user, a machine, or a human programmed computerized device;
the access request further comprises a membership verification token and a rights token; wherein the rights token is a flag indicating the verification token is successfully verified.

25. The system of claim 12, wherein the membership verification token comprises at least one token selected from a group consisting of a purchase permission, a rental permission, or membership permission coupled to a royalty scheme;
wherein the permission is represented by one or more of a letter, number, combination of letters and numbers, phrase, authorization, list, interface button or an instrument of trade for access rights of the encrypted digital media.

26. The system of claim 12, wherein the encrypted digital media capable of interoperability between a plurality of data processing devices, is further authored by an authoring system comprising:
a selection module, the selection module selecting one or more media items to form the encrypted digital media;
a password module, the password module entering a master password which provides access to the encrypted digital media for editing;
a customization module, the customization module customizing user access panel of the encrypted digital media;
a database module, the database module connecting the encrypted digital media to a database of membership verification token required for decrypting the encrypted digital media; and
an encryption module, the encryption module encrypting the one or more media items to create the encrypted digital media.

* * * * *

UNITED STATES PATENT AND TRADEMARK OFFICE
CERTIFICATE OF CORRECTION

PATENT NO. : 8,402,555 B2
APPLICATION NO. : 13/397517
DATED : March 19, 2013
INVENTOR(S) : William Grecia It is certified that error appears in the above-identified patent and that said Letters Patent is hereby corrected as shown below:

In the Claims

In claim 1, column 14, line 49; claim 12, column 16, line 17; and claim 15, column 16, line 63:

the word "connection", in each occurrence, should be changed to --a connection--

In claim 1, column 14, line 52; claim 12, column 16, line 20 and 21; and claim 15, column 16, line 66:

the word "Applications", in each occurrence, should be changed to --Application--

In claim 1, column 14, line 53; claim 12, column 16, line 21; and claim 15, column 16, line 67:

the phrase "obtained from", in each occurrence, should be changed to --related to--

In claim 14, column 16, line 43:

the word "on" should be changed to --one--

In claim 19, column 17, line 47:

the word "-comprising" should read --comprising--

Signed and Sealed this
Twenty-fourth Day of September, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,402,555 B2  
APPLICATION NO. : 13/397517  
DATED : March 19, 2013  
INVENTOR(S) : William Grecia Page 1 of 1

It is certified that error appears in the above-identified patent and that said Letters Patent is hereby corrected as shown below:

In the Claims

In claim 11, column 15, line 57; claim 16, column 17, line 14; and claim 25, column 18, line 26:

"selected from a group consisting of a purchase permission, a rental permission, or membership permission coupled to a royalty scheme; wherein the permission is represented by", in each occurrence, should be changed to and read as --selected from the group consisting of a purchase permission, a rental permission, and a membership permission, coupled to a royalty scheme; wherein the purchase permission, rental permission, and membership permission is represented by--

In claim 4, column 15, line 16; and claim 20, column 17, line 52:

"content provider" in each occurrence, should be changed to and read as --a content provider--

Signed and Sealed this  
Fourth Day of February, 2014

Michelle K. Lee  
*Deputy Director of the United States Patent and Trademark Office*